March 20, 1956
G. O. HOFFSTETTER
2,738,960
MIXING AND BLENDING MACHINE
Filed Oct. 15, 1953
3 Sheets-Sheet 1
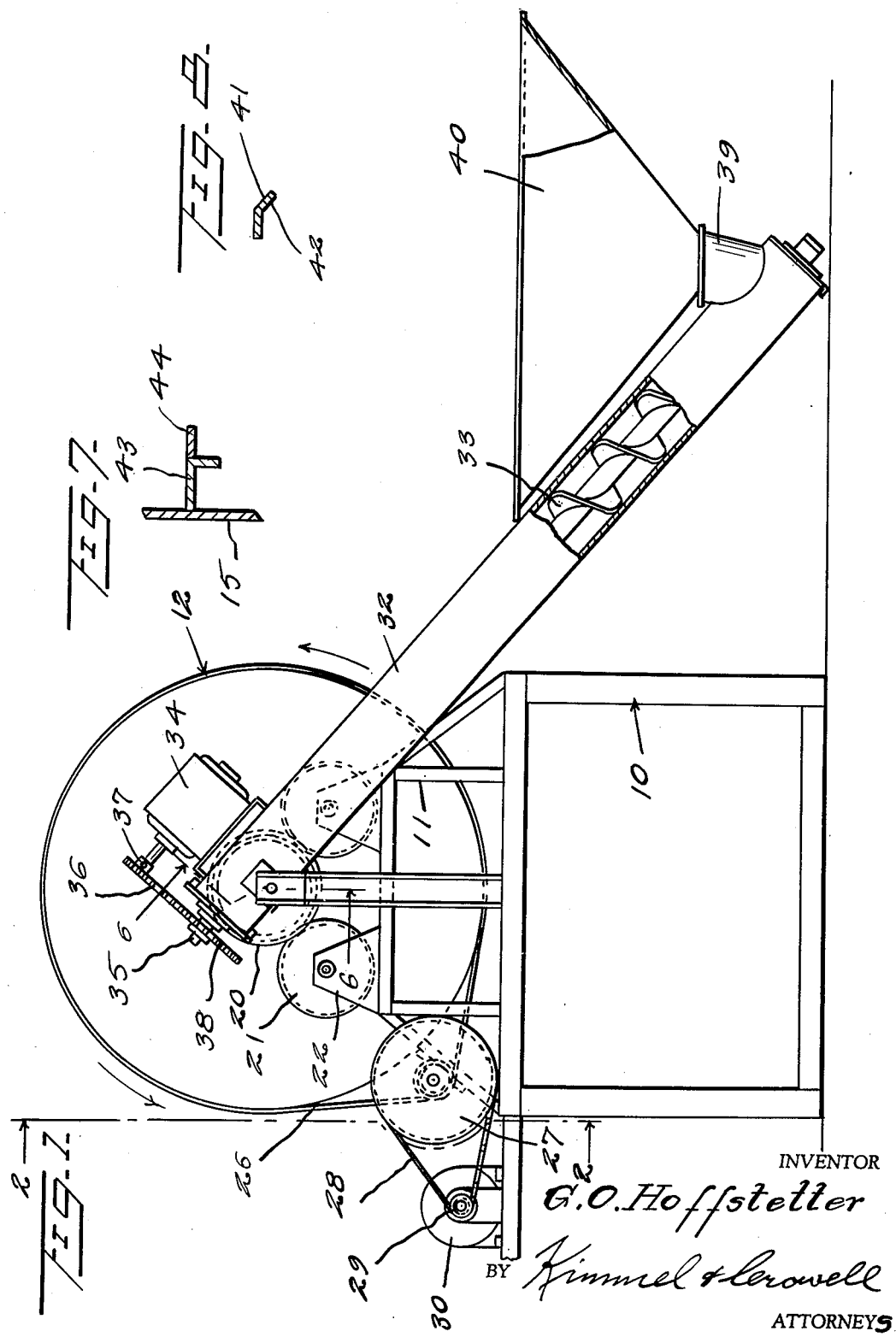
INVENTOR
G. O. Hoffstetter
BY Kimmel & Crowell
ATTORNEYS

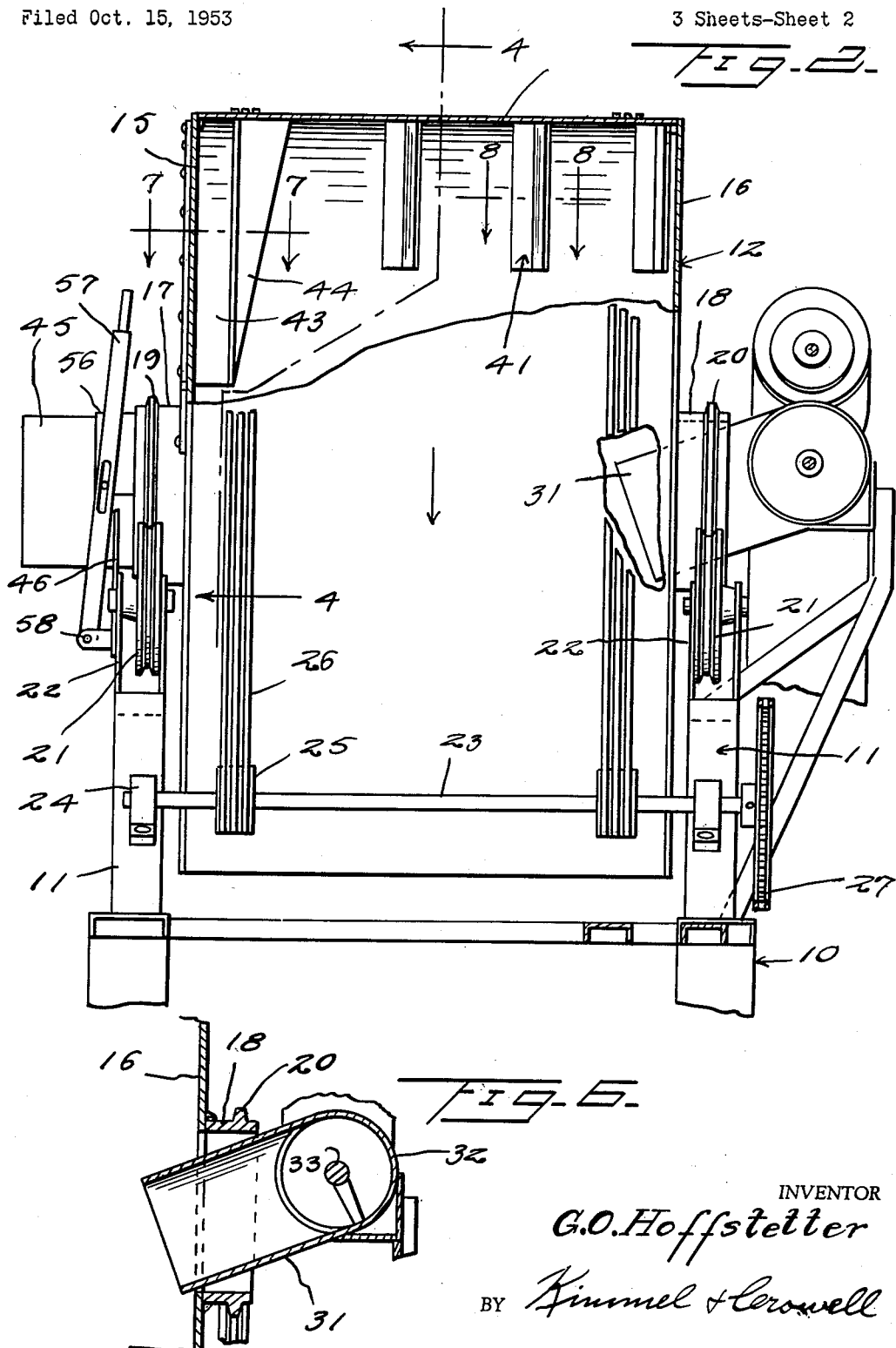

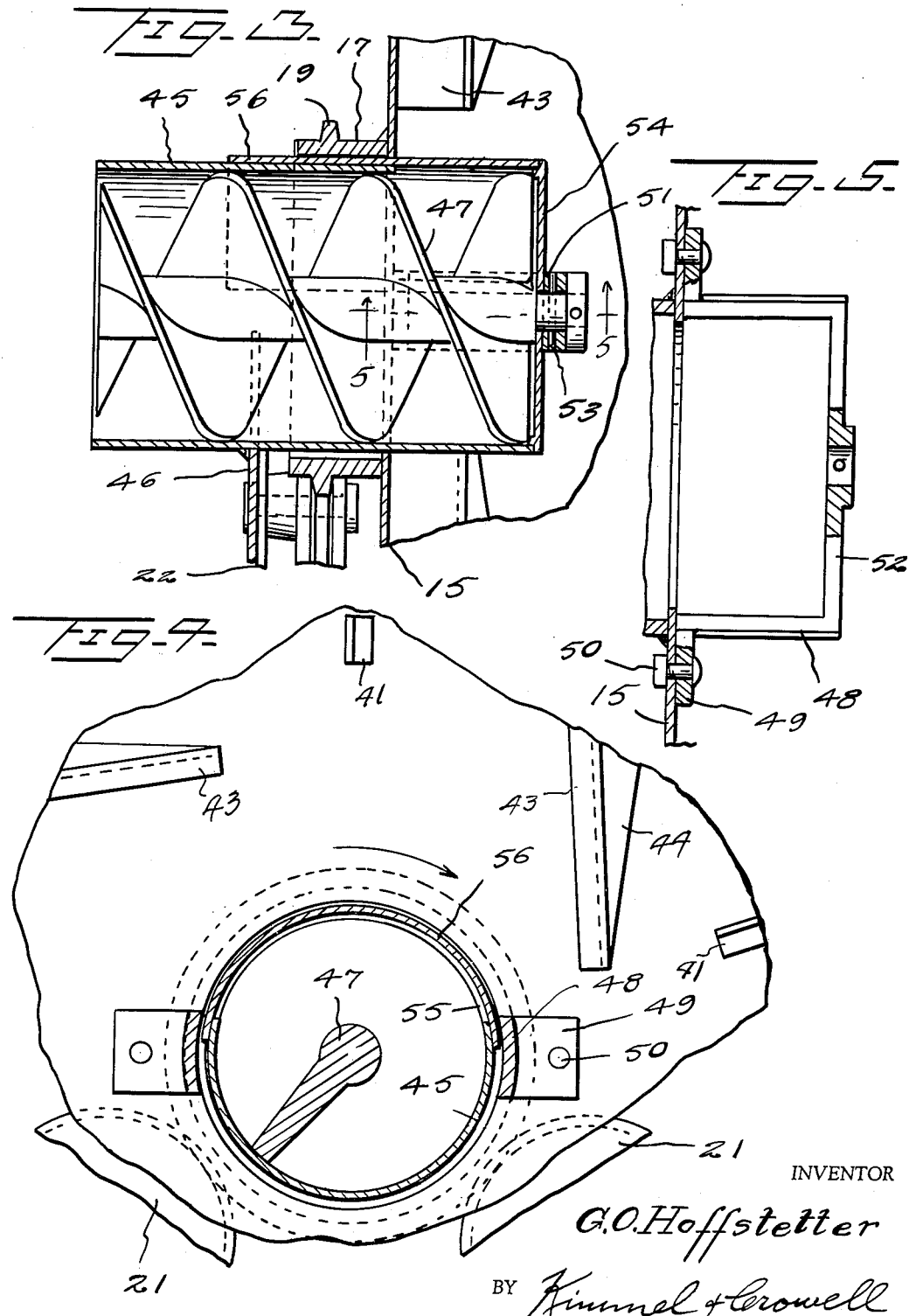

United States Patent Office 2,738,960
Patented Mar. 20, 1956

2,738,960

MIXING AND BLENDING MACHINE

George O. Hoffstetter, Jerseyville, Ill.

Application October 15, 1953, Serial No. 386,151

3 Claims. (Cl. 259—3)

This invention relates to a blending and mixing machine.

An object of this invention is to provide a blending or mixing machine for mixing a number of granular and/or powdered materials.

Another object of this invention is to provide a blending or mixing machine which includes a rotary mixing drum with an improved means for discharging the material from the drum and for delivering the material to the drum.

A further object of this invention is to provide a blending or mixing machine which includes an improved rotary mixing drum having mounted interiorly thereof, a series of mixing blades and a series of discharge blades.

A further object of this invention is to provide a blending or mixing machine which embodies a cylindrical drum with an improved means for rotatably supporting the drum.

With the above and other objects in view, my invention consists in the arrangement, combination and details of construction disclosed in the drawings and specification and then more particularly pointed out in the appended claims.

In the drawings:

Figure 1 is a detailed side elevation partly broken away and in section of a mixing and blending machine constructed according to an embodiment of this invention.

Figure 2 is a sectional view taken on the line 2—2 of Figure 1.

Figure 3 is a fragmentary vertical section through the discharge end of the machine.

Figure 4 is a fragmentary sectional view taken on the line 4—4 of Figure 2.

Figure 5 is a fragmentary sectional view taken on the line 5—5 of Figure 3 with the discharge conveyor removed.

Figure 6 is a fragmentary sectional view taken on the line 6—6 of Figure 1.

Figure 7 is a fragmentary sectional view taken on the line 7—7 of Figure 2.

Figure 8 is a fragmentary sectional view taken on the line 8—8 of Figure 2.

Referring to the drawings the numeral 10 designates generally a base frame structure having mounted on the upper side thereof, drum supporting members 11.

A drum generally indicated at 12 is rotatably carried by the supporting members 11 and is formed of a cylindrical body 14 having end walls 15 and 16 secured to the opposite ends thereof. End wall 15 has projecting therefrom, an axially disposed nipple 17 and end wall 16 has extending therefrom an axially disposed nipple 18. Nipple 17 has fixed to the periphery thereof an annular rib 19, and nipple 18 has fixed to the periphery thereof an annular rib 20.

A pair of spaced apart grooved rollers 21 are carried by a pair of upstanding bearing supports 22 which extends from the supports 11 and ribs 19 engage in pairs of the rollers 21. A countershaft 23 is journalled in bearings 24, and has fixed thereon a pair of multi-grooved pulleys 25. A plurality of belts 26 engage each series of pulleys 25 and engage about the periphery of drum 12. The shaft 23 has fixed to one end thereof, a relatively large sprocket 27 about which a chain 28 engages and chain 28 is rotated by means of a driving sprocket 29 connected with a motor or power member 30.

Nipple 18 is the intake nipple of drum 12 and a downwardly and inwardly inclined nipple 31 extends loosely through the nipple 18. Nipple 31 is connected with the upper end of a tubular elevator housing 32 within which a screw elevator 33 is rotatably mounted.

The elevator 33 is rotated by means of a motor 34 which is connected with the conveyor shaft 35 by means of a chain 36 engaging over a driving sprocket 37 and a driven sprocket 38, the latter being fixed to shaft 35. The elevator housing 32 extends obliquely and downwardly and the lower end of housing 32 has secured thereto, a conical hopper 40. The material which is being mixed is discharged into the hopper 40 and is then carried upwardly, being mixed as it is moved upwardly by the elevator screw 33.

The material is discharged from nipple 31 into drum 12 and the interior of drum 12 has secured thereto, a plurality of longitudinally spaced apart and substantially radially disposed mixing blades 41. The mixing blades 41, as shown in Figure 8, are formed of a substantially V-shaped bar 42 which has one side thereof substantially parallel with the axis of drum 12, and the other side thereof inclined to the left or in the direction of movement of the material in drum 12.

A plurality of angle shaped discharge blades 43 are fixed to end wall 15 and the interior of cylindrical member 14, and a substantially triangular web 44 extends from the inner side of angle member 43 with the base thereof outermost, and serves as an extension of the discharge blade 43.

A discharge tube 45 is loosely disposed through nipple 17 and is fixed relative to the base 10 by means of a plate 46 which is fixed to adjacent roller supports 22. A rotary discharge screw or conveyor 47 is loosely disposed in the discharge tube 45, the latter projecting through end wall 15 and into drum 12.

The inner end of discharge conveyor or screw 47 is fixed relative to the drum 12 by means of a U-shaped member 48 having outturned lugs 49 secured by fastening members 50 to end wall 15.

The shaft 51 is fixed relative to U-shaped member 48 and extends through the bight 52 thereof by means of a key or pin 53. In this manner conveyor 47 will rotate with drum 12 and will move the material in the inner portion of tube 45 outwardly through the outer open end of tube 45. Tube 45 has secured to the inner end thereof, an inner end wall 54 and the upper side of tube 45 is provided with an intake opening 55 within which the material, raised upwardly by and sliding from blades 43, is adapted to engage.

A transversely arcuate regulating valve 56 slidably engages the discharge tube 45 and is moved longitudinally of discharge tube 45 by means of a valve operating lever 57 pivoted as at 58 to plate 46.

In the use and operation of this mixing and blending machine, the granular material which is to be mixed is discharged into the conical hopper 40. The material from hopper 40 will move into the lower end of elevator housing 32 and will be raised and simultaneously mixed by the elevator screw 33. The partially mixed material is then discharged through the nipple 31 into the center of drum 12 which at this time is rotating in the direction of the arrow in Figure 1.

As the drum 12 rotates, the material discharged thereinto will be additionally mixed by the blades 41 which, at the same time, will move the material endwise or to the left as viewed in Figure 2.

During the initial mixing operation, valve member 56 will be disposed in its innermost closed position, which is the position shown in Figure 3. After the material has been thoroughly mixed, valve member 56 is moved outwardly by outward rocking of the lever 57 so that at each rotation of drum 12, a portion of the mixed material will be discharged through opening 55 and into the inner end of discharge tube 45. The material discharged into tube 45 will be moved outwardly or to the left as viewed in Figure 3, by discharge screw or conveyor 47 which rotates with drum 12. The mixing and blending machine hereinbefore described is designed particularly for mixing or blending feeds, fertilizers, or the like so that the several ingredients or chemicals embodied in the mixture will be very thoroughly mixed or blended.

What is claimed is:

1. A mixing and blending machine comprising a drum having a base, a cylindrical body mounted for rotation on said base, end walls carried by said body, an axially disposed nipple carried by each of said end walls, an annular rib carried by each of said nipples, a pair of drum supporting rollers mounted on said base, each of said rollers having a V-shaped groove formed therein to receive said ribs, a plurality of V-shaped mixing blades carried by said drum, said mixing blades having an end thereof fixedly secured to said body and extending radially inwardly therefrom with a side thereof extending substantially parallel to the axis of said drum, a plurality of discharge blades, each having an elongated quadrilateral configuration including a pair of opposed spaced and parallel ends of different lengths, said ends being substantially perpendicular to a side of each of said discharge blades, each of said discharge blades having a side therefo angularly inclined with respect to said parallel ends and oppositely disposed with respect to said first side, a rib integrally formed with each of said discharge blades and projecting laterally from a side thereof, said ribs dividing each of said discharge blades into adjacent rectangular and triangular sections, said first sides of said discharge blades and the longest of said ends thereof being fixedly secured to one of said end walls and to said body, said discharge blades being radially spaced with respect to the axis of said drum, a tubular discharge member fixedly mounted on said base and loosely projecting through and extending on opposite sides of said nipple carried by said one end wall, said tubular member having an opening extending through the upper side thereof, a valve member having an arcuate configuration in transverse cross-section, said valve member being slidably mounted on said tubular member for reciprocation across said opening, said valve member being interposed between said nipple carried by said one end wall and said discharge member, an operating lever connected with said valve member, a screw conveyor in said discharge member, a U-shaped element straddling the inner end of said discharge member and having the bight position thereof fixed to said screw conveyor and its arms secured to said one end wall for rotation of said screw conveyor with said drum, means rotating said drum, and means discharging material to be mixed into said drum through the other of said nipples.

2. A mixing and blending machine comprising a drum having a base, a cylindrical body mounted for rotation on said base, end walls carried by said body, an axially disposed nipple carried by each of said end walls, an annular rib carried by each of said nipples, a pair of drum supporting rollers mounted on said base, each of said rollers having a V-shaped groove formed therein to receive said ribs, a plurality of mixing blades carried by said drum, said mixing blades having an end thereof fixedly secured to said body and extending radially inwardly therefrom, a plurality of discharge blades, said discharge blades being fixedly secured to one of said end walls and to said body, said discharge blades being radially spaced with respect to the axis of said drum, a tubular discharge member fixedly mounted on said base and loosely projecting through and extending on opposite sides of said nipple carried by said one end wall, said tubular member having an opening extending through the upper side thereof, a valve member having an arcuate configuration in transverse cross-section, said valve member being slidably mounted on said tubular member for reciprocation across said opening, an operating lever connected with said valve member, a screw conveyor in said discharge member, means fixedly securing said screw conveyor to said one end wall for rotation with said drum, means rotating said drum, and means discharging material to be mixed into said drum through the other of said nipples.

3. A mixing and blending machine comprising a drum having a base, a cylindrical body mounted for rotation on said base, end walls carried by said body, an axially disposed nipple carried by each of said end walls, a plurality of mixing blades carried by said drum, said mixing blades having an end thereof fixedly secured to said body and extending inwardly therefrom, a plurality of discharge blades, said discharge blades being fixedly secured to one of said end walls and to said body, said discharge blades being radially spaced with respect to the axis of said drum, a tubular discharge member fixedly mounted on said base and loosely projecting through and extending on opposite sides of said nipple carried by said one end wall, said tubular member having an opening extending through the upper side thereof, a valve member having an arcuate configuration in transverse cross-section, said valve member being slidably mounted on said tubular member for reciprocation across said opening, said valve member being interposed between said nipple carried by said one end wall and said discharge member, an operating lever connected with said valve member, a screw conveyor in said discharge member, a U-shaped element straddling the inner end of said discharge member and having the bight portion thereof fixed to said screw conveyor and its arms secured to said one end wall for rotation of said screw conveyor with said drum, means rotating said drum, and means discharging material to be mixed into said drum through the other of said nipples.

References Cited in the file of this patent

UNITED STATES PATENTS

| 324,595 | Saint Requier | Aug. 18, 1885 |
| 1,027,317 | Burford et al. | May 21, 1912 |
| 1,048,763 | Tiedtke | Dec. 31, 1912 |
| 1,271,433 | Cassel | July 2, 1918 |
| 1,558,580 | Bishop | Oct. 27, 1925 |
| 1,713,568 | Swenson | May 21, 1929 |
| 1,884,423 | Walker | Oct. 25, 1932 |

FOREIGN PATENTS

| 552,533 | France | May 2, 1923 |